UNITED STATES PATENT OFFICE.

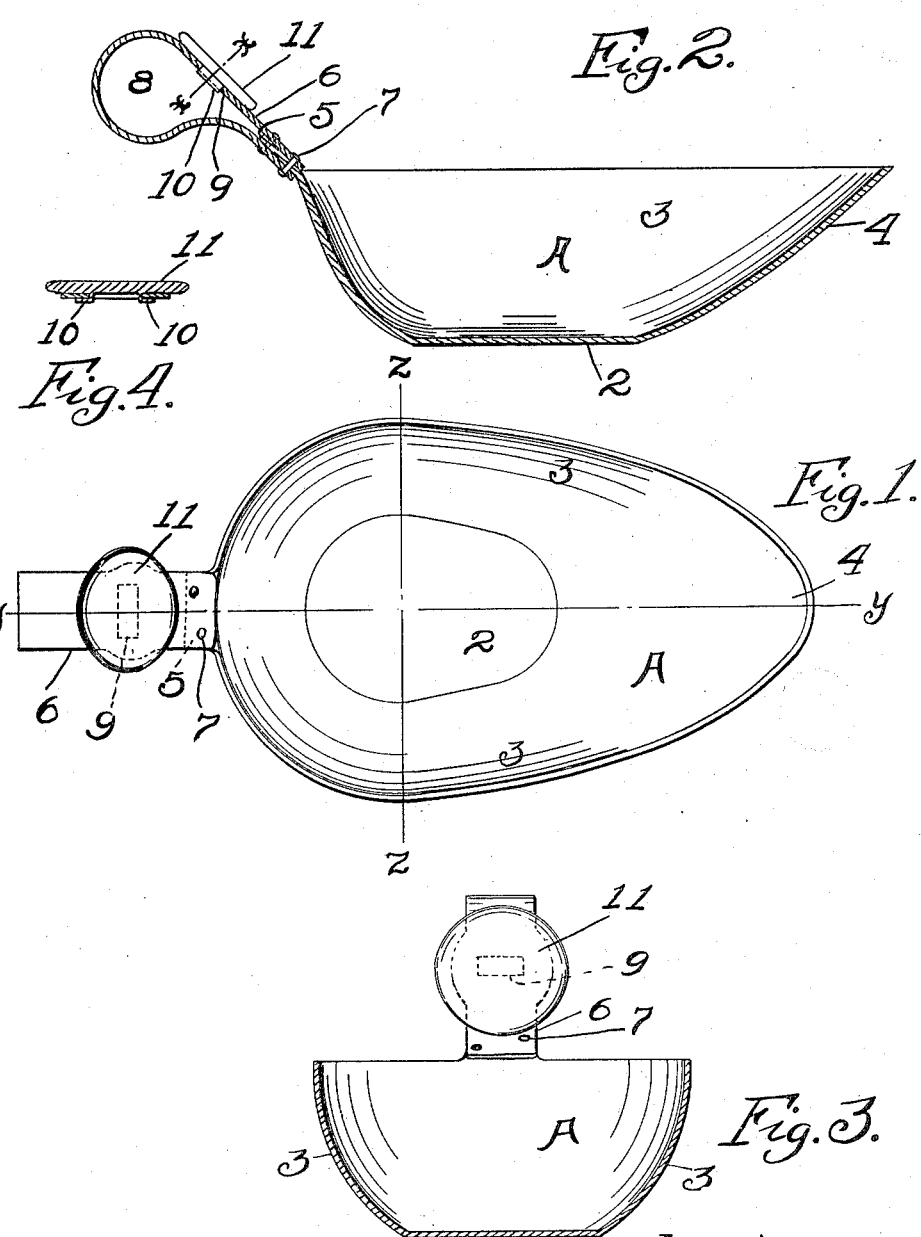

FRANK J. KRISTOFEK, OF ST. PAUL, MINNESOTA, ASSIGNOR TO BROWN & BIGELOW, OF ST. PAUL, MINNESOTA, A CORPORATION OF MINNESOTA.

SCOOP.

1,228,373.        Specification of Letters Patent.        Patented May 29, 1917.

Application filed April 21, 1914. Serial No. 833,420.

*To all whom it may concern:*

Be it known that I, FRANK J. KRISTOFEK, a citizen of the United States, residing at St. Paul, in the county of Ramsey and State of Minnesota, have invented a new and useful Improvement in Scoops, of which the following is a specification.

This invention relates to a scoop for use as a culinary article in the handling of flour, sugar and other materials. The primary object of the invention is the production of a scoop by stamping out of metal or other thin material, and forming the same with a flat stability bottom upon which the scoop is adapted to stand without tipping.

In the accompanying drawing forming part of this specification, Figure 1 is a plan of my invention; Fig. 2 is a longitudinal section on line Y—Y, Fig. 1; Fig. 3 is a section on line Z—Z, Fig. 1, and Fig. 4 is a section of a detail, the section being taken on the line X—X, of Fig. 2.

In the drawing, A represents the body of the scoop of usual shape, except that the bottom is made with a flat portion 2 of sufficient area and suitably positioned, so as to form a stable support to prevent the scoop tipping. The side portion 3 of the scoop may be of any suitable shape, that illustrated being formed with a long lip 4 acting as a pouring end. The opposite end of the scoop from the pouring portion is formed with a lip 5 inclined upwardly and outwardly to which a handle in the form of a flat strip of material 6 is secured by its ends through the use of a rivet 7 passing through the lip and the ends of the handle. The handle is shaped with a convenient opening 8 to admit a finger or thumb for holding the scoop. The handle is also perforated at 9 to receive a clip 10 for securing a button 11 which forms a broad surface upon which the thumb may be placed when the handle is clasped in the hand. This button may be of any suitable construction and forms a convenient surface for displaying an advertisement.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention, what I claim as new and desire to protect by Letters Patent is:—

An advertising novelty, comprising, a scoop consisting of a shell forming a body portion having a horizontal flat stability base, said body portion terminating at one extremity in an elongated upwardly inclined pouring portion and at its opposite extremity in a lip, a loop member secured to said lip forming a hand grasp, and a button having a flat upper surface secured to said loop forming a broad thumb bearing surface and affording an advertising medium, the said portions at the opposite extremities of said base counter-balancing one another, whereby its stability is enhanced.

In testimony whereof, I have signed my name to this specification, in the presence of two subscribing witnesses.

FRANK J. KRISTOFEK.

Witnesses:
B. M. COMBS,
S. L. WASCHENBERGER.

Copies of this patent may be obtained for five cents each, by addressing the "Commissioner of Patents, Washington, D. C."